(12) United States Patent
Vaughn

(10) Patent No.: US 11,099,342 B2
(45) Date of Patent: Aug. 24, 2021

(54) SAFETY GUARD DEVICE FOR MODULES STORING COMMUNICATION LINES

(71) Applicant: OFS Fitel, LLC, Norcross, GA (US)

(72) Inventor: Roger A Vaughn, Greer, SC (US)

(73) Assignee: OFS FITEL, LLC, Norcross, GA (US)

( * ) Notice: Subject to any disclaimer, the term of this patent is extended or adjusted under 35 U.S.C. 154(b) by 345 days.

(21) Appl. No.: 16/364,870

(22) Filed: Mar. 26, 2019

(65) Prior Publication Data

US 2020/0218026 A1     Jul. 9, 2020

Related U.S. Application Data

(60) Provisional application No. 62/788,007, filed on Jan. 3, 2019.

(51) Int. Cl.
*G02B 6/44*     (2006.01)
*G02B 6/48*     (2006.01)

(52) U.S. Cl.
CPC .......... *G02B 6/4446* (2013.01); *G02B 6/4441* (2013.01); *G02B 6/486* (2013.01)

(58) Field of Classification Search
None
See application file for complete search history.

(56) References Cited

U.S. PATENT DOCUMENTS

| | | | | |
|---|---|---|---|---|
| 5,311,612 A | * | 5/1994 | Vincent ................. | G02B 6/4454 385/135 |
| 5,923,807 A | * | 7/1999 | Wild ....................... | G02B 6/444 385/135 |
| 5,947,765 A | * | 9/1999 | Carlson, Jr. .......... | G02B 6/4466 439/535 |
| 6,361,360 B1 | * | 3/2002 | Hwang ................ | G02B 6/4457 385/135 |
| 9,291,788 B2 | * | 3/2016 | Rudenick ............. | G02B 6/4454 |
| 9,632,267 B1 | | 4/2017 | Burek et al. | |

(Continued)

FOREIGN PATENT DOCUMENTS

GB     2553491 A     3/2018

OTHER PUBLICATIONS

European Patent Office, Extended Search Report on corresponding EP Application 20150042.8 (dated May 8, 2020).

*Primary Examiner* — Jerry Rahll
(74) *Attorney, Agent, or Firm* — Law Offices of Leo Zucker

(57) ABSTRACT

A safety device for modules that store windings of communication lines, includes a metallic rod whose ends are configured to receive metallic screws to secure the rod on a base of a given module. End sections of the rod extend to a height at least equal to the height of the stored windings. Intermediate sections of the rod extend in opposite directions from the end sections, substantially parallel to the module base. Outer ends of the intermediate sections at least coincide with the outer periphery of the stored windings. A central section of the rod has opposite ends adjoining the outer ends of the intermediate sections. The central section rises over a path that at least coincides with the outer periphery of the stored windings. The end sections of the rod capture the windings, and the central section prevents them from dropping below the module during a building fire.

3 Claims, 2 Drawing Sheets

(56) References Cited

U.S. PATENT DOCUMENTS

| | | | |
|---|---|---|---|
| 2004/0035600 A1* | 2/2004 | Dietrichson | B65H 75/364 |
| | | | 174/40 R |
| 2007/0137882 A1 | 6/2007 | Journeaux et al. | |
| 2015/0226929 A1* | 8/2015 | Diatzikis | G02B 6/4457 |
| | | | 385/135 |
| 2016/0033733 A1* | 2/2016 | Burek | G02B 6/4457 |
| | | | 385/135 |
| 2018/0113268 A1* | 4/2018 | Van Baelen | G02B 6/46 |

* cited by examiner

SAFETY GUARD DEVICE FOR MODULES STORING COMMUNICATION LINES

CROSS REFERENCE TO RELATED APPLICATION

This application claims priority under 35 U.S.C. § 119(e) of U.S. Provisional Patent Application No. 62/788,007 filed Jan. 3, 2019, titled Point of Entry (POE) Module Clip, the entire contents of which are incorporated herein by reference.

BACKGROUND OF THE INVENTION

Field of the Invention

The present invention concerns modules for storing optical fibers, cables, or other lines that distribute communication services to living units inside a multiple dwelling unit (MDU) building, and particularly to a device for preventing the stored lines from dropping into the paths of responders and other persons in the building during a fire.

Discussion of the Known Art

Fire safety issues have arisen over the installation of optical fibers, wires, cables, and other communication lines through hallways and evacuation routes in MDU buildings, when the lines were installed only by the use non-metallic fasteners or other means that can fail during a building fire. In such cases, the lines become free to hang loosely beneath the failed fasteners and can impede the movements of firefighters as they try to extinguish the fire. Injuries and deaths have been reported under such conditions. For example, loose hanging lines have become entangled with firefighter uniforms and breathing apparatus, making it impossible for the responders to escape before exhausting their air supplies. Investigators concluded that if the lines are not adequately retained in place during the course of a building fire, all persons inside the building will always be at risk.

Point of entry (POE) modules for storing coils or windings of optical fibers are often mounted on hallway walls inside MDU buildings, wherein each module is located above or near an entrance to an associated living unit along each hallway. To provide fiber optic network service for a given living unit, a fiber inside the unit which has been designated for the unit is connected to a drop fiber that is routed inside the unit. See, e.g., applicant's U.S. Pat. No. 9,632,267 (Apr. 25, 2017), all relevant portions of which are incorporated by reference.

POE modules are typically made from a plastic (e.g., a polypropylene copolymer) that meets local fire safety regulations with respect to smoke and flammability, but which softens or melts at the sustained high temperatures of building fires. Because of this, network service providers are concerned that the modules may melt to such a degree that any fiber windings stored inside them will become unrestrained and will drop into the paths of responders and building occupants as they move through hallways and living units inside the building.

U.S. patent application Ser. No. 16/184,366 filed Nov. 8, 2018, and assigned to the present applicant, discloses concealable metallic safety fasteners for communication lines that are bonded along a supporting surface by an adhesive or other non-metallic means that could fail during a building fire. Moreover, U.S. patent application Ser. No. 16/219,247 filed Dec. 13, 2018, and also assigned to the present applicant, discloses metallic fire safety retention clips for installation in POE and other modules that store windings of optical fibers. All relevant portions of the mentioned '366 and '247 applications are incorporated herein by reference.

Notwithstanding the known art, there is a need for a guard device for POE and other modules that store optical fibers, cables, or other communication lines, wherein the lines are retained safely in place and out of the paths of responders and others during a building fire; and particularly for such a device that can be easily and quickly installed with the modules or afterward.

SUMMARY OF THE INVENTION

According to the invention, A safety guard device for modules constructed to store windings of communication lines includes a rigid metallic rod opposite ends of which have openings for receiving metallic screws to secure the rod to the base of a given module. Opposite end sections of the rod extend normally from the module base when the rod is secured to the base, and the end sections have a height corresponding at least to the height of windings of a communication line when stored over the module base. The rod also has intermediate sections extending in generally opposite directions from one another and substantially parallel to the module base, wherein the intermediate sections are of sufficient length so that outer ends of the sections coincide at least with the outer periphery of the windings of the communication line.

Additionally, the rod has a central section opposite ends of which adjoin corresponding outer ends of the intermediate sections, so that when the rod is secured in the module, the central section of the rod rises from the intermediate sections over a path that at least coincides with the outer periphery of the windings of the communication line.

The end sections of the rod are configured to catch and support the windings of the communication line if other parts of the module fail due to temperature or otherwise, and the central section of the rod is dimensioned and arranged to block the windings from leaving the end sections and dropping into the paths of responders or other building occupants moving below the module.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

As used herein, the terms fiber and cable are used interchangeably to refer to an optical fiber that may be buffered or jacketed, and to a fiber optic cable that contains two or more fibers. The term communication line is intended to be used broadly to refer to an optical fiber, a fiber optic cable, a wire cable, or a hybrid cable.

Figure 1:
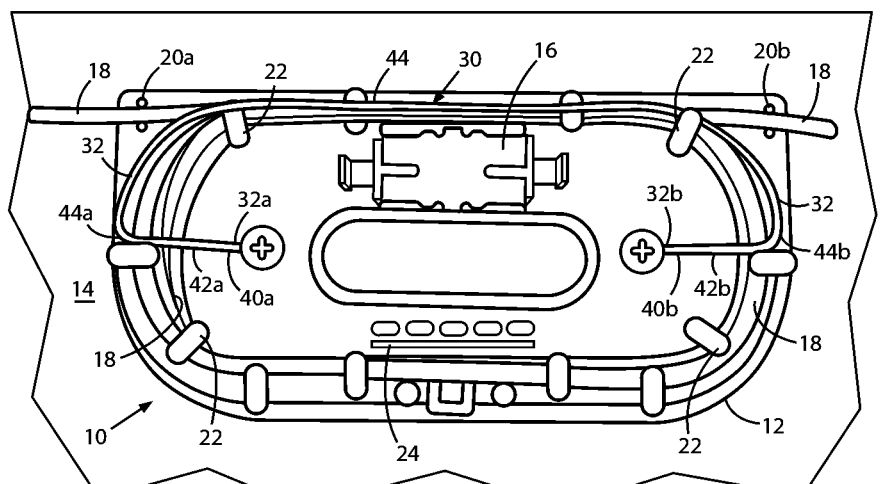
FIG. 1 is an elevational view of a mounted point-of entry (POE) module in which a safety guard device according to the invention is installed.

FIG. 1 is a plan view of an uncovered POE module 10 having a generally rectangular base 12 measuring, e.g., about 5.25 inches long by 2.5 inches high. The base 12 is mounted on a building wall 14, for example, above an entry door of a living unit along a hallway of a MDU building. The module 10 may be similar to one available from OFS Fitel, LLC, as item #301107454 which includes an SC-APC connector adapter 16, item #301107447 which includes an LC-APC connector adapter, or item #301107462 which features a splice tray.

The module 10 also has an associated cover (not shown in the drawing) that snaps onto and protectively encloses the base 12 together with a slack winding or coil of a fiber optic distribution cable 18 that is retained over the base. It will be understood, however, that the present invention can be applied to other modules in which slack windings or coils of communication lines are stored, including, for example, the compact POE module disclosed in the earlier mentioned U.S. Pat. No. 9,632,267.

The distribution cable 18 in FIG. 1 contains a number of fibers designated for living units along the hallway in which the module 10 is mounted. The cable 18 is routed along the hallway wall 14 and passes inside the module 10 through a first port 20a at the upper left of the base 12 as viewed in FIG. 1. A slack length of the cable 18 is wound one or more times about a set of retaining posts or fingers 22 that project upward near the periphery of the base 12. The remainder of the cable 18 passes outside the module 10 through a second port 20b at the upper right of the base 12 in FIG. 1.

When occupants of the living unit beneath which the module 10 is mounted want access to a fiber optic network distributed via the cable 18, a first opening is formed in the jacket of the wound cable inside the module 10, and a fiber designated for the living unit is identified and cut. A second opening is formed in the jacket of the cable a certain length from the first opening, and a corresponding end length of the designated fiber is pulled out of the second opening. The designated fiber is then terminated in a first connector that mates to one side of the connector adapter 16. One end of a drop fiber is terminated in a second connector, and the second connector is mated to the opposite side of the adapter 16.

The drop fiber is routed through the wall 14 and into the living unit to connect, for example, to an optical network terminal (ONT) that interfaces various electronic devices (e.g., televisions and cable modems) inside the unit with the fiber optic network. Alternatively, the designated fiber can be spliced directly to the drop fiber, and the spliced ends of the fibers protectively sleeved and stored in a splice holder 24 on the module base 12.

Figure 2:
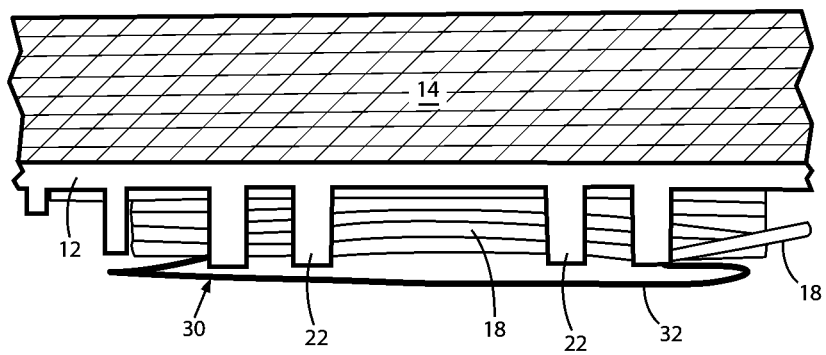
FIG. 2 is a top view of the POE module in FIG. 1.
Figure 3:
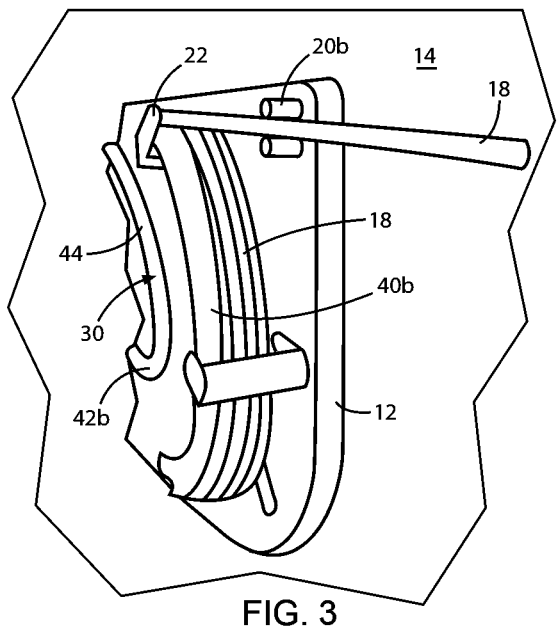
FIG. 3 is a perspective view of the of the POE module as seen from the right in FIG. 1.
Figure 4:
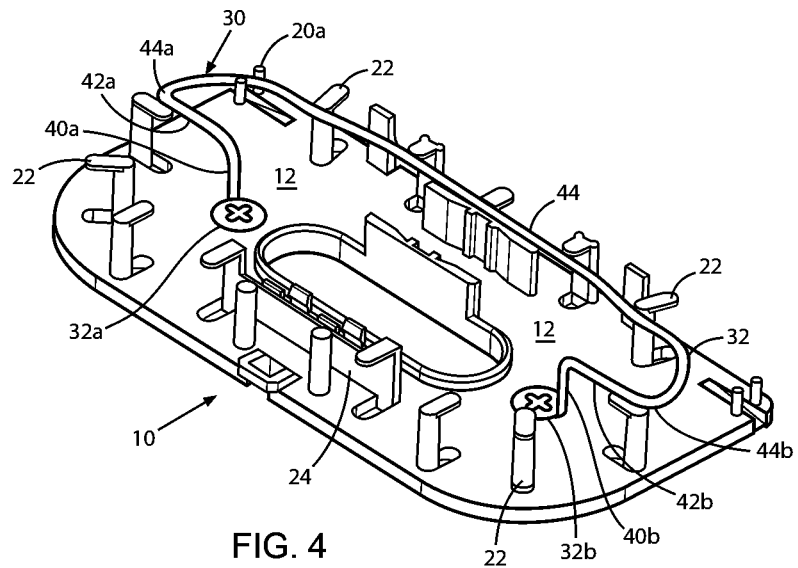
FIG. 4 is a view of the inventive safety guard device as installed in the POE module with certain items shown in FIGS. 1-3 omitted for clarity.

According to the invention, a safety guard device 30 is installed in the module 10, wherein the device 30 is dimensioned and arranged to capture and retain, i.e., to cradle the windings of the distribution cable 18 if plastics parts of the module including the posts 22 about which the cable 18 is wound should melt or otherwise fail during a fire. FIG. 2 is a view of the module 10 with the installed device 30 when looking down from the top of the base 12 in FIG. 1, and FIG. 3 is a perspective view of the module 10 with the installed device 30 as seen from the right in FIG. 1. FIG. 4 shows the inventive safety guard device 30 as installed in the module 10, but with the distribution cable 18 and its windings omitted from the drawing for purposes of clarity.

In the illustrated embodiment, the device 30 is in the form of a rigid metallic wire or rod 32 that is capable of surviving sustained high temperatures without softening or weakening significantly, and of capturing and retaining the windings of the distribution cable 18 in place if the retaining posts 22 and/or other parts of the module 10 fail to do so. As explained below, the device 30 can be deployed either at the time or after the installation of the module 10. The device is entirely passive and works effectively without requiring additional hardware or cable management in or around the module 10.

As shown in FIG. 1, each one of opposite ends 32a, 32b of the rod 32 is looped or otherwise configured to form an opening for receiving a corresponding metallic screw 34a, 34b. The screws 34a, 34b may be the same screws that are used to mount the module base 12 on the hallway wall 14. The rod 32 is formed so that when the opposite ends 32a, 32b of the rod are secured to the module base 12 by tightening the screws 34a, 34b, opposite end sections 40a, 40b of the rod 32 extend normally from the base 12 by a distance H at least equal to the height of the windings of the cable 18 on the module base 12.

Intermediate sections 42a, 42b of the rod 32 extend from the end sections 40a, 40b of the rod, in generally opposite directions from one another and substantially parallel to the module base 12. As shown in FIG. 1, the intermediate sections 42a, 42b each have a minimum length L so that the outer ends of the sections 42a, 42b coincide with the outer periphery of the wound cable 18 on the module base 12.

A central section 44 of the rod 32 is joined at opposite ends 44a, 44b to corresponding outer ends of the intermediate sections 42a, 42b. As seen in the drawing, the central section 44 rises upward from the outer ends of the intermediate sections 42a, 42b within a plane generally parallel to the module base 12, and over a path that at least coincides with the outer periphery of the stored windings of the cable 18 or lies farther beyond.

Experiments were conducted to simulate a fire in a building in which the POE module 10 was mounted on the wall 14 with the inventive safety guard device 30 secured on the module base. The rod 32 was made of either spring steel or common carbon steel, 16 gauge.

It was found that when the surrounding temperature was set high enough to melt the module 10 including the base 12 and retaining posts 22 over a period of two hours, the device 30 alone acted to capture the windings of the cable 18 and prevent them from dropping below the module. That is, as detailed below, the device 30 prevented the cable windings from hanging loosely and posing a hazard to persons who may need to move beneath the module.

The safety guard device 30 can take the form of the rigid wire or rod 32 as illustrated, or any equivalent metallic structure. As mentioned, the device 30 can be installed when the module 10 is initially mounted on the wall 14, or afterward by removing the metallic screws 34a, 34b from mounting holes already formed in the module base 12, passing the screws through openings formed in the device 30, reinserting the screws in the mounting holes in the base, and re-tightening the screws.

When plastics parts of the module 10 melt from heat captured, e.g., at the ceiling level of a hallway during a building fire and the parts flow downward, the windings of the cable 18 stored over the module base 12 will also start to descend. As can be seen in FIGS. 1 and 3, when the posts 22 along the top of the base 12 are no longer able to support the upper portion of the cable windings and the windings slide downward, the windings will be captured by the end sections 40*a*, 40*b* of the rod 32 which extend normal to the plane of the windings and within the inner periphery of the windings. The rising central section 44 of the rod 32 then acts as a guard to block the cable windings from falling away from the end sections 40*a*, 40*b*. The cable windings are effectively cradled by the guard device 30 and prevented from dropping, e.g., in front of a doorway above which the module 10 is mounted, and from impeding the movement of responders and building occupants trying to enter or exit the doorway during a fire.

While the foregoing describes and illustrates preferred embodiments of the present invention, it will be understood by persons of ordinary skill in the art that various changes, modifications, and additions can be made without departing from the spirit and scope of the invention, and that the invention includes all such changes, modifications, and additions that are within the scope of the following claims.

I claim:

1. A safety guard device for modules constructed to store windings of communication lines, comprising:

a rigid metallic wire or rod, wherein opposite ends of the rod are configured to form corresponding openings for receiving metallic screws for securing the rod to the base of a given module, and opposite end sections of the rod extend normally from the module base when the ends of the rod are secured to the base, and the end sections have a height corresponding at least to the height of windings of a communication line when stored on the base of the module;

the rod has intermediate sections extending generally in opposite directions from one another and substantially parallel to the base of the module when the rod is secured to the base, and the intermediate sections are of sufficient length so that outer ends of the sections at least coincide with the outer periphery of the windings of the communication line; and the rod has a central section opposite ends of which adjoin corresponding outer ends of the intermediate sections of the rod, so that when the rod is secured to the module base, the central section rises from the outer ends of the intermediate sections over a path that at least coincides with the outer periphery of the windings of the communication line;

wherein the end sections of the rod are configured to capture and support the windings of the communication line if other parts of the module fail due to temperature or otherwise, and the central section of the rod is dimensioned and arranged to block the windings from falling away from the end sections and dropping into the paths of responders or other building occupants moving below the module.

2. A safety guard device according to claim 1, wherein the central section of the rod is formed to rise within a plane that is generally parallel to the base of the module in which the device is installed.

3. A safety guard device according to claim 1, wherein the wire or rod is formed of steel.

\* \* \* \* \*